United States Patent [19]
Fontán Tarodo et al.

[11] Patent Number: 6,067,240
[45] Date of Patent: May 23, 2000

[54] ELECTRIC POWER DISTRIBUTION SYSTEM WITH BATTERY BACKUP

[75] Inventors: Antonio Fontán Tarodo; Enrique De La Cruz Moreno; Salvador Ollero Velasco; Javier Ara Gómez; Manuel Vázquez López, all of Madrid, Spain

[73] Assignee: Alcatel, Paris, France

[21] Appl. No.: 09/217,826

[22] Filed: Dec. 22, 1998

[30] Foreign Application Priority Data

Dec. 29, 1997 [ES] Spain ......................................... 9702714

[51] Int. Cl.[7] ........................................................ H02M 7/00
[52] U.S. Cl. ................................................ 363/51; 307/38
[58] Field of Search ......................... 307/30, 380; 363/51, 363/86

[56] References Cited

U.S. PATENT DOCUMENTS 5,483,464  1/1996  Song ........................................... 307/38

FOREIGN PATENT DOCUMENTS 0 575 101 A2  12/1993  European Pat. Off. .
0 593 258 A3   4/1994  European Pat. Off. .
0 696 831 A2   2/1996  European Pat. Off. .

*Primary Examiner*—Shawn Riley
*Attorney, Agent, or Firm*—Sughrue, Mion, Zinn, Macpeak & Seas, PLLC

[57] ABSTRACT

A power distribution system that provides electric power to an electrical device and to an energy storage device. The system includes a rectifier connected to an alternating current mains network to provide a rectified sinusoidal voltage via power leads connected to a charging device that provides DC voltage to the energy storage device. In addition, the electrical device(s) are connected to the power leads and include a plurality of converters, each one being connected to at least one load. Each converter is connected to the power leads in order to supply a DC voltage to its respective load.

10 Claims, 3 Drawing Sheets

6,067,240

ELECTRIC POWER DISTRIBUTION SYSTEM WITH BATTERY BACKUP

OBJECT OF THE INVENTION

The present invention refers to a distribution system for supplying electric power to electrical and/or electronic equipment, being of special but not exclusive application in a telecommunications system.

The electric power distribution system converts an alternating voltage from a commercial mains network into a DC voltage, in such a way that the content in harmonics of the input current fulfils the international standards, like for example EN61000-3-2; therefore the distribution system comprises means to correct the power factor.

STATE OF THE ART

It is known that an electric power distribution system to feed in an uninterrupted manner a telecommunications system comprises rectifier means which are connected to a commercial AC mains network, for example is of 220 V, converting said AC voltage into a DC voltage, for example of 48 V.

In the event of failure of the commercial AC mains network, a battery supplies electric power to the telecommunications system, said battery also being supplied from the rectifier means.

Therefore, the rectifier means are designed to supply from the DC voltage all the power required by the battery and the equipment that constitutes the telecommunications system, for example converters, electronic boards, computers, etc. The DC voltage is distributed by means of power leads.

In general, the power distribution systems have a low overall efficiency, $\eta \leq 0.7$ for example, taking into account all the conversion processes that take place and the losses that occur in the power distribution. As a result, the power lost, transformed into heat, is dissipated in dissipating means, for example heat sinks.

The lower the efficiency of the AC into DC power conversion process, the greater will be the volume of the dissipating means and consequently the greater will be the size of the rectifier means. Another parameter that has an effect on the size of the rectifier means is the power that they have to supply, thus the greater the power the greater the size, whereby the cost of the rectifier means is high.

SUMMARY OF THE INVENTION

An object of this invention is to provide an electric power distribution system to overcome the drawbacks mentioned. To this end, the power distribution system converts the power from an alternating current mains network into a rectified sinusoidal voltage, this latter voltage being distributed to the equipment that forms a telecommunications system and also to energy storage means. These latter means shall supply the power which they have stored whenever the AC mains network fails.

As a result, the power distribution system has a high efficiency, low cost and, as a whole, occupies a reduced space, as well as fulfils the international standards concerning the content in harmonics of the input current, for example EN61000-3-2.

The electric power distribution system comprises rectifier means, the input terminals of which are connected to the AC mains and its output terminals are connected to power leads to distribute the rectified sinusoidal voltage produced by the rectifier means.

The power leads distribute the rectified sinusoidal voltage to charging means to supply a DC voltage for the energy storage means; and also to electrical means that constitute the telecommunications system itself.

The rectifier means produce and distribute over the power leads a rectified sinusoidal voltage, due to which said rectifier means have a higher efficiency and, consequently, require fewer dissipating means to dissipate the losses, thereby, as a whole, the volume occupied is less.

BRIEF DESCRIPTION OF THE FIGURES

A more detailed explanation of the invention is provided in the following description, based on the attached figures, in which.

DESCRIPTION OF THE INVENTION

Figure 1:
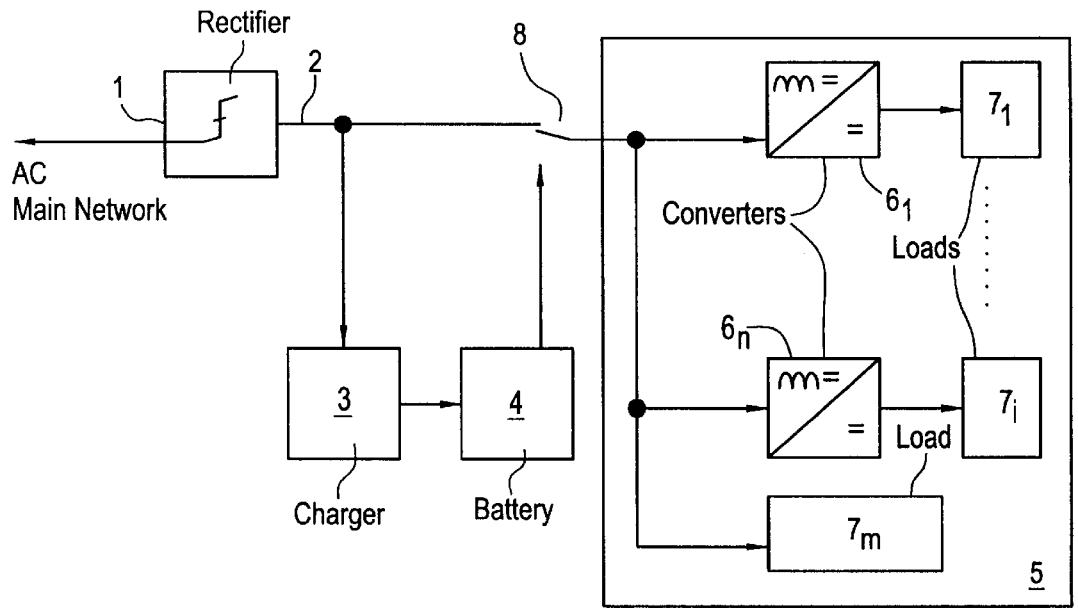
FIG. 1 shows a block diagram of a preferred embodiment of a power distribution system according to the invention.

FIG. 1 shows a block diagram of the power distribution system, which supplies electric power in an uninterrupted manner to a telecommunications system. Said distribution system comprises rectifier means 1, which convert an alternating voltage to a rectified sinusoidal voltage. To this end, said rectifier means 1 are connected via input terminals to a commercial AC mains network, and distribute the rectified sinusoidal voltage by means of power leads 2. These latter leads 2 are connected to output terminals of the rectifier means 1.

The rectifier means 1 are formed by, for example, a diode bridge or a controlled rectifier bridge, both types of bridge being well known in the state of the art, for which reason neither its configuration nor its operation, respectively, is described.

The power leads 2 distribute said sinusoidal voltage to electrical means 5, for example a telecommunications system, through switching means 8, and to energy storage means 4, for example a battery, through charging means 3.

The rectified sinusoidal voltage before being applied to the storage means 4 has to be transformed into a DC voltage, this conversion being carried out by the charging means 3, for which its input terminals are connected to the power leads 2 and its output terminals are connected to the energy storage means 4.

On the other hand, the electrical means 5 receive the rectified sinusoidal voltage directly, since these electrical means 5 comprise a plurality of converter means $6i$ ($i=1, \ldots, n$) and/or a plurality of electrical loads $7j$ ($j=1, \ldots, m$).

The converter means $6i$ are connected directly via their input terminals to the power leads 2. Thus each converter means $6i$ converts the sinusoidal rectified voltage to a DC voltage in order to apply it to at least one load, the latter being connected to the output terminals of said converter $6i$. The loads can be printed circuit boards with electronic circuitry, for example.

In addition, each electrical load 7j is connected directly to the power leads 2. These electrical loads may be power supply units to ensure a continuous supply of AC voltage to computers, for example.

In the event of failure of the AC mains network, the power required by the electrical means 5 is supplied by the energy storage means 4.

To this end, the distribution system also comprises a control circuit, not shown in FIG. 1, to detect the absence of the AC mains. When said control circuit detects the absence of the AC mains, it closes the switching means 8, so that the storage means 4 provide the electric power required by the electrical means 5.

In a preferred embodiment, the electric power distribution system fulfils the international standards referring to the content in harmonics of the input current, since both the charging means 3 and the converter means 6i and the electrical loads 7j correct the power factor. The charging means 3 and the converter means 6i and the electrical loads 7j are well known in the present state of the art, for which reason no description are provided of their configurations, nor of their operation.

As has been described above, the rectified sinusoidal voltage is distributed, whereby the rectifier means 1 are simpler, offer a greater efficiency, dissipate less power and consequently are more compact and cost less.

Figure 2:
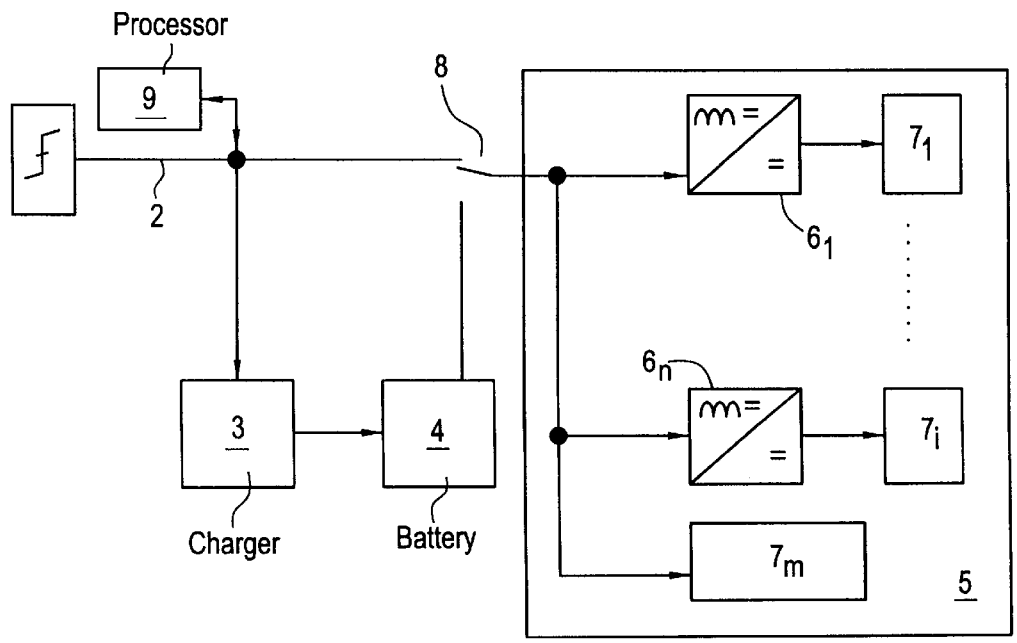
FIG. 2 shows a block diagram of the power distribution system including current processing means according to the invention.

FIG. 2 shows another possible embodiment of the electric power distribution system, in which there are current processing means 9 connected to the power leads 2, before distribution of the rectified sinusoidal voltage to any means requiring this rectified sinusoidal voltage.

The processing means 9 supply and absorb, through its terminals, current to/from the power leads 2 in order to force the current supplied by the rectifier means 1 to follow the waveform of the rectified sinusoidal voltage generated in said rectifier means 1; fulfilling in this way the international standards relative to the content in harmonics of the input current.

As a consequence, in this embodiment it is not necessary that the charging means 3, the converter means 6i and the electrical loads 7j include power factor correction in their normal operation, since the power factor correction is done by the processing means 9. Nor is it necessary to describe either the configuration or the operation of the processing means as they are well known in the state of the art.

Figure 3:
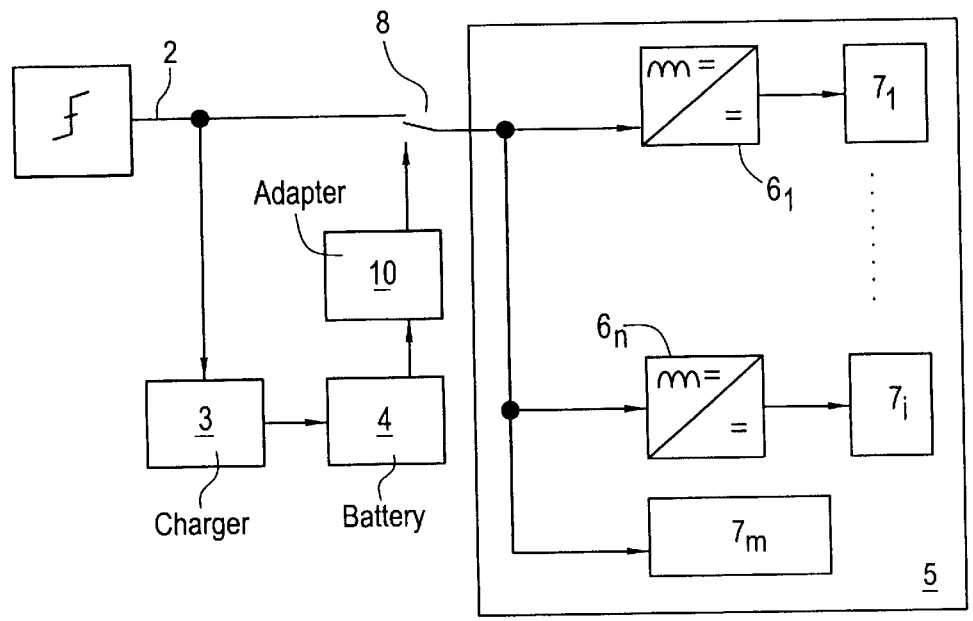
FIG. 3 shows a block diagram of the power distribution system including adapter means according to the invention.

In the case where the storage means 4 supply via their output means 5, it is necessary to have adapter means 10, see FIG. 3, in order for the latter to adapt the voltage levels to those that the electrical means 5 work with. Consequently the electrical means 5 have to work with both the rectified sinusoidal voltage and the DC voltage.

The adapter means 10 are connected across the output terminals of the storage means 4 and the switching means 8.

Figure 4:
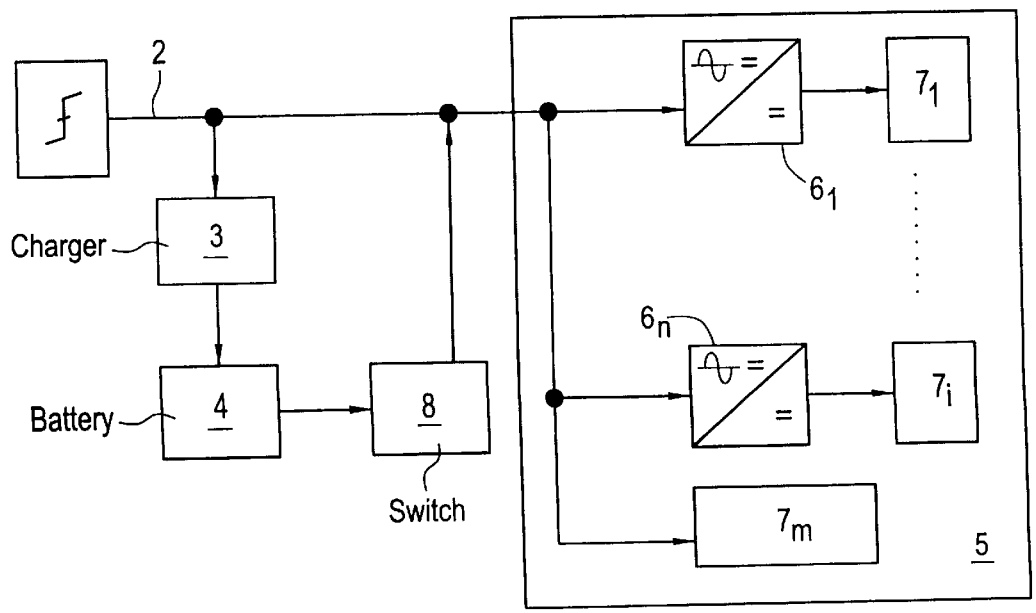
FIG. 4 shows a block diagram of the power distribution system including another position for the switching means according to the invention.

As has already been mentioned, the electrical means 5 work with both the rectified sinusoidal voltage and the DC voltage. In this specific case, the switching means 8 can be placed between the storage means 4 and the electrical means 5, whereby the rectifier means 1 are connected directly to the electrical means 5 (see FIG. 4).

Figure 5:
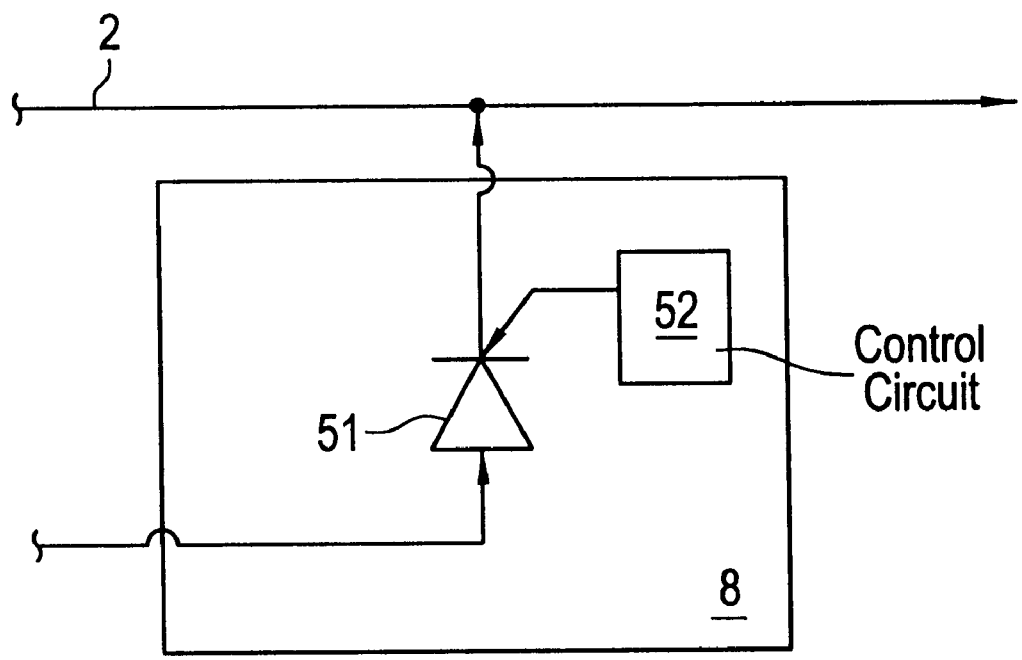
FIG. 5 shows a preferred implementation of the switching means including breaker means according to the invention.

FIG. 5 shows a preferred implementation of the switching means 8 employed in this embodiment. The switching means 8 are formed by one-way breaker means 51 to interrupt the line connecting the storage means 4 and the electrical means 5. In this way the use of switching means in the line that directly joins the rectifier means 1 to the electrical means 5 is avoided, resulting in an improvement in the overall efficiency of the power distribution system, and obviously in a reduction in its overall cost.

The opening and closing of the breaker means 51, for example a diode, is controlled by a control circuit 52 which controls the opening and closing of the breaker means 51 in the presence or absence of the rectified sinusoidal voltage in the electrical means 5.

What is claimed is:

1. An electric power distribution system to supply electric power from an alternating current mains network to at least one electrical device (5) and one energy storage device (4), wherein said system comprises:

a rectifier (1) connected to said alternating current mains network to provide via output terminals a rectified sinusoidal voltage;

power leads (2) connected to said output terminals of said rectifier (1);

a charging device (3) connected to said power leads (2), to supply DC voltage to said energy storage device (4); and a switching device having its input coupled to said power leads and to said energy storage device and supplying electrical power to said electrical device;

said electrical device (5) comprising a plurality of converters (61, ..., 6i, ..., 6n), each one of which is connected to at least one load; each converter (6i) being connected to said power leads (2) in order to supply a DC voltage to its load, respectively.

2. Distribution system according to claim 1, characterised in that said distribution system also comprises a processing means (9) connected to said power leads (2) in order to force the current to follow the waveform of said rectified sinusoidal voltage.

3. Distribution system according to claim 1, characterised in that each converter means (6i) comprises power factor correction means.

4. A distribution system according to claim 1, characterised in that each charging device (3) also comprises a power factor corrector.

5. A distribution system according to claim 1, characterised in that in the event of failure of said alternating current mains network, the energy storage device (40) supplies stored electric power to said electrical device (5) through said switching device (8).

6. A distribution system according to claim 5, characterised in that said switching device (8) comprises a one-way breaker (51) to interrupt the current flow from said energy storage device (4) to said electrical device (5).

7. A distribution system according to claim 6, characterised in that a control circuit (52) controls the opening and closing of said breaker (51), as a function of the presence or absence of said rectified sinusoidal voltage.

8. A distribution system according to claim 5, characterised in that the energy storage device (4) supplies stored electrical power to said electrical device (5) via an adapter (10), which adapts the value of the voltage supplied by said energy storage device (4) to the voltage level required by the electrical device (5).

9. An electric power distribution system to supply electric power from an alternating current mains network to at least one electrical device (5) and one energy storage device (4), wherein said system comprises:

a rectifier (1) connected to said alternating current mains network to provide via output terminals a rectified sinusoidal voltage;

power leads (2) connected to said output terminals of said rectifier (1);

a charging device (3) connected to said power leads (2), to supply DC voltage to said energy storage device (4);

said electrical device (5) comprising a plurality of converters (61, . . . , 6i, . . . , 6n), each one of which is connected to at least one load; each converter (6i) being connected to said power leads (2) in order to supply a DC voltage to its load, respectively; and a processor (9) connected to said power leads (2) in order to force the current to follow the waveform of said rectified sinusoidal voltage.

10. An electric power distribution system to supply electric power from an alternating current mains network to at least one electrical device (5) and one energy storage device (4), wherein said system comprises:

a rectifier (1) connected to said alternating current mains network to provide via output terminals a rectified sinusoidal voltage;

power leads (2) connected to said output terminals of said rectifier (1);

a charging device (3) connected to said power leads (2), to supply DC voltage to said energy storage device (4);

said electrical device (5) comprising a plurality of converters (61, . . . , 6i, . . . , 6n), each one of which is connected to at least one load; each converter (6i) comprising a power factor corrector and being connected to said power leads (2) in order to supply a DC voltage to its load, respectively.

\* \* \* \* \*